US010025924B1

(12) United States Patent
Vagin et al.

(10) Patent No.: US 10,025,924 B1
(45) Date of Patent: Jul. 17, 2018

(54) TASKLESS CONTAINERS FOR ENHANCED ISOLATION OF USERS AND MULTI-TENANT APPLICATIONS

(71) Applicant: Parallels IP Holdings GmbH, Schaffhausen (CH)

(72) Inventors: Andrey Vagin, Seattle, WA (US); Alexey Kobets, Seattle, WA (US)

(73) Assignee: Parallels IP Holdings GmbH, Schaffhausen (CH)

( * ) Notice: Subject to any disclaimer, the term of this patent is extended or adjusted under 35 U.S.C. 154(b) by 112 days.

(21) Appl. No.: 15/248,044

(22) Filed: Aug. 26, 2016

(51) Int. Cl.
*G06F 21/53* (2013.01)
*G06F 9/455* (2018.01)

(52) U.S. Cl.
CPC .............. *G06F 21/53* (2013.01); *G06F 9/455* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 9,547,353 B1* | 1/2017 | Marr | G06F 9/30083 |
| 9,772,792 B1* | 9/2017 | Wallner | G06F 3/0647 |
| 2008/0040335 A1* | 2/2008 | Gatti | G06F 9/443 |
| 2011/0296201 A1* | 12/2011 | Monclus | G06F 21/53 |
| | | | 713/190 |
| 2014/0215595 A1* | 7/2014 | Prasad | G06F 21/41 |
| | | | 726/8 |
| 2015/0150003 A1* | 5/2015 | Emelyanov | G06F 9/455 |
| | | | 718/1 |
| 2016/0088108 A1* | 3/2016 | Felts | H04L 67/1021 |
| | | | 709/223 |
| 2016/0094647 A1* | 3/2016 | Mordani | H04L 47/70 |
| | | | 709/226 |
| 2016/0099915 A1* | 4/2016 | Savelieva | H04L 63/0428 |
| | | | 726/15 |
| 2016/0239343 A1* | 8/2016 | Holt | G06F 9/485 |
| 2016/0261716 A1* | 9/2016 | Khalaf | H04L 67/1002 |
| 2016/0266917 A1* | 9/2016 | Emelyanov | G06F 9/455 |
| 2017/0041288 A1* | 2/2017 | Stotski | H04L 61/2061 |
| 2017/0111365 A1* | 4/2017 | Michael | H04L 63/102 |
| 2017/0171245 A1* | 6/2017 | Lee | H04L 63/20 |
| 2017/0249141 A1* | 8/2017 | Parees | G06F 8/70 |

* cited by examiner

*Primary Examiner* — Adam Lee
(74) *Attorney, Agent, or Firm* — Bardmesser Law Group

(57) ABSTRACT

A system for managing Containers, including a hardware node running an OS; a multi-tenant application on the node; and a plurality of Containers under the OS. A process of the multi-tenant application uses only one Container at a time. Remaining Containers available to the process are taskless Containers. An arbiter controls permissions for the process to switch from one Container to another Container. The arbiter defines trusted and untrusted execution contexts. Code of the process executing in the untrusted context is not permitted to switch Containers, and the code of the process executing in the trusted context is permitted to switch Containers. The arbiter detects attempts to switch Containers, and prevents them when executing untrusted code. Upon a request to the multi-tenant application, the arbiter switches the process that will process the user request to one of the taskless Containers and executes the request in the untrusted context.

28 Claims, 7 Drawing Sheets

TASKLESS CONTAINERS FOR ENHANCED ISOLATION OF USERS AND MULTI-TENANT APPLICATIONS

BACKGROUND OF THE INVENTION

Field of the Invention

The invention relates to virtualization, and, more particularly, to using Container virtualization for enhancing isolation for multi-tenant applications at minimum additional costs.

Description of the Related Art

The original concept of Containers started with Virtual Private Servers (VPS), which were developed and used as a more scalable alternative to Virtual Machines. Such an approach was used to run different instances of an operating system (e.g., different LINUX™ distributions) on one shared kernel. Later it was realized that the Containers can be used to execute individual applications (application Containers), and that this approach needs even less resources. A logical development of this concept was to create isolated virtual environments (VE) on the application level (i.e., to use containerized applications, where the applications execute inside the containers).

Such an approach substantially improves security of multiuser scripts (i.e., Software Multitenancy). The idea is to create a special isolated virtual environment (a Container), for each user, where code running in the isolated Container environment is used to process the interactions with an associated user only. For example, there are virtual or shared hostings, where a single web server is used to process queries to several web sites. In this case, the web server isolates the sites, each having its own configuration description defining the parts of the file system the users have access to. However, the users can upload their own scripts using low-level means for accessing the file system and for interacting with other processes, etc. Therefore, it was logical to create isolated environments for the users on the lowest level—i.e., using a Container virtualization.

The Container virtualization does not just restrict access to some resources—it allows for hiding them from view completely. Without Containers, a process "sees" an entire file tree, while its operations with the files are restricted by access rights only. If there is an error generated while assigning the access rights (or they are changed due to some vulnerability), the files can be easily accessed. When the Container visualization is used, a user cannot see other users' files at all, preventing him or her from accessing them. At the same time, Containers do not replace access rights. Instead, they complement them by introducing an additional level of protection.

In a multitenant architecture, it is difficult to isolate users from one another. Ideally, each user's queries should be processed in an associated isolated environment. For example, there are shared hostings, where each user can execute his own scripts. It is important to ensure that the users are not able to access the files of their counterparts. Conventional Containers can be used to solve this issue. Conventional solutions allow for creation of a new Container and for running a new process in the Container. However, it is impossible to change Containers within a single process using conventional means.

Accordingly, it is desired to have taskless Containers that can be used or switched to upon requests within a single process being executed.

SUMMARY OF THE INVENTION

The invention relates to virtualization, and, more particularly, to a Container virtualization that enhances isolation between users of a multi-tenant application at minimum additional costs that substantially overcomes one or more disadvantages of the related art.

In an exemplary embodiment, a method, system and computer product for implementing and using taskless Containers, the system including a hardware node running an operating system; a multi-tenant application running under the operating system; a plurality of Containers instantiated under the operating system, wherein a process of the multi-tenant application uses only one Container at any one time, and wherein the remaining Containers are taskless Containers; an arbiter component that controls permissions for the process to switch from one Container to another Container, wherein the arbiter component defines trusted and untrusted execution contexts, such that code of the process executing in the untrusted context is not permitted to switch Containers, and the code of the process executing in the trusted context is permitted to switch Containers, and wherein the arbiter component detects any attempts to switch Containers, and prevents these attempts when executing the code in an untrusted context, and wherein, upon a request from a user to the multi-tenant application, the arbiter component switches the process of the multi-tenant application to one of the taskless Containers.

In a further embodiment, a system for managing Containers (CTs) residing on a common host includes at least one working CT running on the host OS kernel and executing user processes; at least one taskless CT configured to have namespaces and not executing processes; a multi-tenant application running on the common host; and an interpreter Virtual Machine (VM) running on the host and configured to receive and process user requests. The interpreter VM is configured to select the taskless CT based on the user request; and switch to the taskless CT from a working container for execution of the user request by the multi-tenant application. The interpreter VM is the only component in the system that is permitted to switch CTs.

Optionally, the interpreter VM is further configured to identify for each user request a corresponding user whose context is required for processing of the user request.

Optionally, the interpreter VM runs on the same host as the CTs and serves as an arbiter between the CTs. Optionally, each taskless Container corresponds to one user.

In a further embodiment, a method for managing Containers residing on a common host includes instantiating at least one working Container executing user's processes on a host; launching an arbiter Virtual Machine (VM) on the host, wherein the arbiter VM is a code interpreter; initializing at least one taskless Container on the host; creating namespace handles for the taskless Container by the arbiter VM; keeping the namespace handles open; receiving a user request; select the taskless CT based on the user request; and switching, by the arbiter VM, the user process for executing the user request from the working container to the taskless Container by using pre-opened namespace handles for that Container. The arbiter VM is the only component in the system that is permitted to switch Containers.

Optionally, the method also includes parsing the user request to identify the user whose context is required to process the request. Optionally, the method also includes killing containers' creation processes in the taskless Container by the arbiter VM. Optionally, the method also includes creating an additional taskless Container on-the-fly, when there is no Container corresponding to the user of the user request. Optionally, the method also includes creating a pool of taskless Containers, including the taskless Containers for all users are created in advance.

Optionally, the method also includes removing an inactive Container from the pool, and wherein the Container is marked as inactive if it does not receive user requests for a pre-defined time period.

In a further embodiment, the step of creating the taskless Container further includes creating needed namespaces for the taskless Container; and binding the created namespaces by creating namespace handles for the created namespaces.

Optionally, the method also includes switching the namespaces; switching to an untrusted context; and executing the user request.

In a further embodiment, a system for managing Containers includes a hardware node running an operating system; and a multi-tenant application running under the operating system; a plurality of Containers instantiated under the operating system.

Optionally, a process of the multi-tenant application uses only one Container at any one time. The remaining Containers available to the process are taskless Containers. An arbiter component controls permissions for the process to switch from one Container to another Container. The arbiter component defines trusted and untrusted execution contexts, such that code of the process executing in the untrusted context is not permitted to switch Containers, and the code of the process executing in the trusted context is permitted to switch Containers. The arbiter component detects any attempts to switch Containers, and prevents these attempts when executing the code in an untrusted context. Upon a request from a user to the multi-tenant application, the arbiter component switches the process that will process the user request to one of the taskless Containers and executes the request in the untrusted context.

Optionally, the taskless Containers do not have any processes running in them. Optionally, the arbiter component analyzes the code of the process before executing it, to prevent the attempts to switch the Containers. Optionally, the arbiter component uses any of ptrace, audit, and selinux to prevent the attempts to switch Containers. Optionally, the arbiter component is a runtime environment. Optionally, the arbiter component is an interpreter virtual machine.

In a further embodiment, a method for managing Containers includes, on a hardware node running an operating system, starting a multi-tenant application under the operating system; and instantiating a plurality of Containers under the operating system. A process of the multi-tenant application uses only one Container at any one time. The remaining Containers available to the process are taskless Containers. An arbiter component controls permissions for the process to switch from one Container to another Container, defines trusted and untrusted execution contexts, such that code of the process executing in the untrusted context is not permitted to switch Containers, and the code of the process executing in the trusted context is permitted to switch Containers; detects any attempts to switch Containers, and prevents these attempts when executing the code in an untrusted context. Upon a request from a user to the multi-tenant application, using the arbiter component to switch the process that will process the user request to one of the taskless Containers and executing the request in the untrusted context.

Optionally, the instantiating of the taskless Containers includes, for each taskless Container, creating the needed namespaces for the taskless Container; and creating namespace handles for the namespaces. Optionally, the Containers include any of a mount, a net, an ipc (inter-process communication), and a UTS (UNIX Timesharing System) namespaces. Optionally, all Containers that belong to a process work inside one pid namespace. Optionally, the Containers available to a process have a common user namespace. Optionally, the process uses namespace handles to switch between Containers.

Optionally, processes used for setup of the taskless Container are killed, while the namespaces continue to exist. Optionally, receiving the user request and processing it in one of the Containers is implemented within a single process. Optionally, the arbiter component verifies that user code does not contain function calls to switch Containers. Optionally, the arbiter component allows or disallows the process of the multi-tenant application, within which the arbiter is working, to switch between the Containers. Optionally, all taskless Containers are created at startup and form a container pool, which is then used by the multi-tenant application. Optionally, the arbiter component discards any taskless Containers that do not get user requests for a long time.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
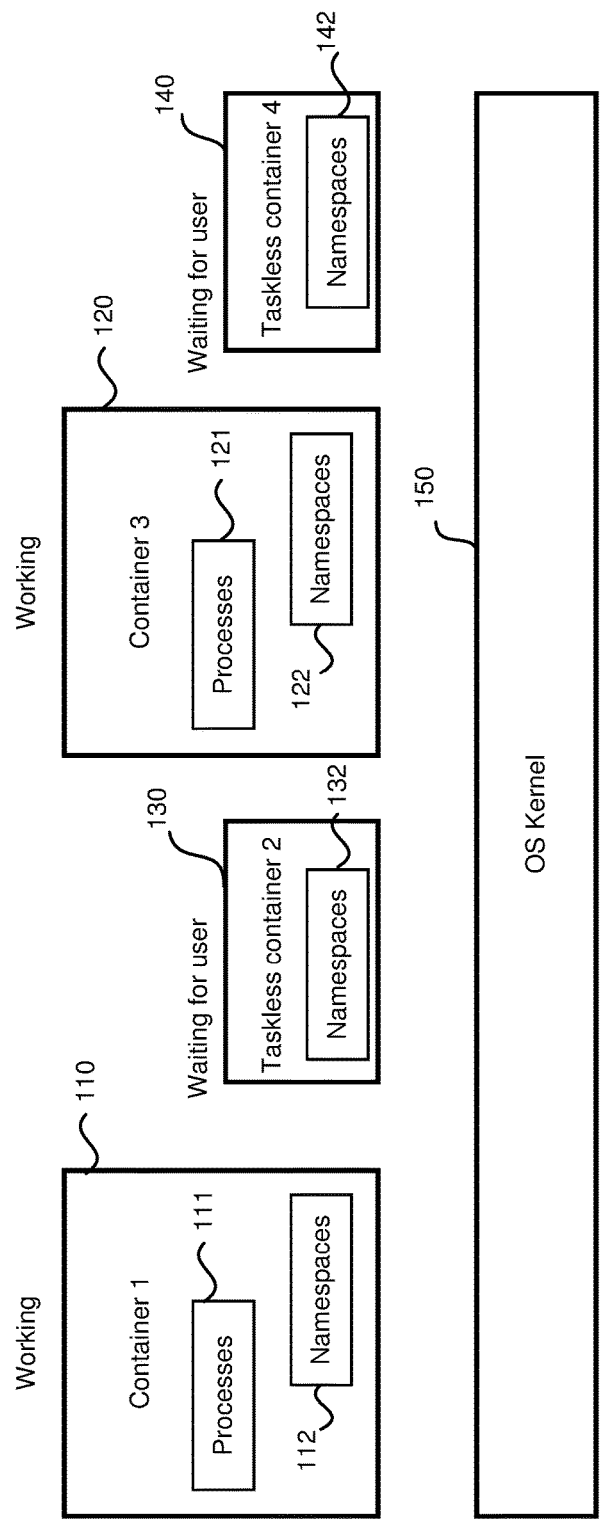
FIG. 1 illustrates ordinary Containers and taskless Containers implemented within the same host system.

Reference will now be made in detail to the preferred embodiments of the present invention, examples of which are illustrated in the accompanying drawings.

The following definitions are used throughout the description.

Virtual Execution Environment, a type of environment that supports program code execution, where at least a part of the real hardware and software required for running program code are presented as their virtual analogs. From the point of view of the user, the code in Virtual Execution Environment runs as if it were running on the real computing system. The examples of VE are virtual machines (VM), interpreter VMs, Java VMs, virtual private servers (VPSs, also called containers or operating system containers), application containers, Java Runtime Environments, other types of runtime environments, etc.

Virtual Private Server (VPS) (also called Container), is one type of a Virtual Execution Environment running on the same hardware system with a single shared OS kernel and most of the system resources, where isolation of Virtual Execution Environments is implemented on the namespace level. A Virtual Private Server, often referred to as "Container," is a closed set, or collection, of processes, system resources, users, groups of users, objects and data structures. Each VPS/Container has its own ID, or some other identifier, that distinguishes it from other VPSs/Containers.

The VPS/Container offers to its users a service that is functionally substantially equivalent to a standalone server. From the perspective of an administrator of the VPS/Container, the VPS/Container acts the same as a dedicated computer at a data center with a remote access. For example, the administrator of the VPS/Container has the same remote access to the server through the Internet, the same ability to reload the server, load system and application software, authorize VPS/Container users, establish disk space quotas of the users and user groups, support storage area networks (SANs), set up and configure network connections and web servers, etc. In other words, the full range of system administrator functions is presented, as if the VPS/Container were a dedicated remote server, and the existence of the VPS/Container is transparent from the perspective of both the VPS/Container user and the VPS/Container administrator.

The Container virtualization, also known as OS-level virtualization, provides users with separate virtual environments (i.e., Containers) that operate as isolated independent systems. The isolation is made using the operating system namespaces. A namespace wraps a global system resource in an abstraction that makes it appear to the processes within the namespace so that they have their own isolated instance of the global resource. Changes to that resource are visible to other processes that are members of that namespace, but are invisible to other processes. Operating systems have namespaces for various kernel subsystems, such as networks, processes, file systems, kernel objects, register, etc. For example, kernel object namespaces in WINDOWS™ can be used for isolating kernel objects (e.g., mutexes) used by one process from other processes. LINUX™ uses namespaces allowing to isolate different kernel subsystems, e.g.:

mount—to isolate the file tree;
net—to isolate the network stack;
ipc—to isolate inter-process interaction means;
uts—to isolate Hostname and NIS domain name;
pid—to isolate the process tree;
user—to isolate security-related identifiers and attributes.

These namespaces are the main means of isolating of containers and can be divided into two groups. The first group includes the mount, the net, the ipc (inter-process communication), and the uts (UNIX Timesharing System) namespaces. A process can switch from one namespace to another namespace, do something and then switch back to its original namespace.

However, the second group (pid, user) is more complicated. In order to get into the pid namespace, a new process has to be created. In case of the username namespace, once the process gets out of some space, it will not be able to get back into it, since all the original privileges are lost.

Another feature of the first group is that it takes a relatively long time to set up such namespaces, especially, the mount and the network namespaces. In case of the mount namespaces, all parts of file hierarchy have to be mounted first. In case of the network namespaces the system has to create devices and assign addresses, routing tables, filtering rules, etc.

The present invention is directed to a method, system and computer product for Container virtualization that reduces the time necessary for container deployment, as well as to using Container virtualization for enhancing isolation in the context of multi-tenant user applications.

An application is a set of processes. All these processes share a set of Containers. Each process has the Arbiter component to control where a Container can be switched. In essence, there are two contexts for executing code: trusted and untrusted. A code in the untrusted context should not have rights to switch a container. For example, considering a web server application, the code of the web server is running in the trusted context, but all third party scripts are running in the untrusted context (i.e., in an isolated environment).

According to an exemplary embodiment, a taskless Container holds namespaces (that need a long time for their setup) that are created in advance. Then, the processes used for the setup are killed, while the namespaces continue to operate, and the process can get into or out of them at any moment.

In order to achieve maximum performance with limited resources, the following approach can be used. The Containers are needed to isolate different users, and they take a relatively long time to be created, therefore they are created once on startup. At this stage, separate file trees and virtual networks are created for each user. After the namespaces had been configured, the processes used for their set up are killed. From there on, when the system receives a query, it only has to find out the addressee and get into corresponding taskless Container environment, which has been prepared in advance. Receiving a user request and processing it in one of the Containers is, advantageously, implemented within a single process and does not require a lot of extra resources. The resources can be reduced even further, since there are no processes in the taskless Container. A simple experiment involving creation of mount namespaces has shown that the taskless Containers consume five times less resources than the Containers containing one process.

A similar model has been implemented in the LibCT library (http:***github.com/xemul/libct): after the configuration has been described, the Container is created. After all the actions regarding namespace setup have been fulfilled, a file from /proc/PID/ns/ is opened for each namespace. These file descriptors are then used to get into the associated namespaces. When the process needs to switch Containers, the process calls "libct_container_switch", which takes the process to a given set of namespaces. This function calls a standard system call "setns" with the previously opened descriptors before.

According to the exemplary embodiment, all taskless Containers can be created at startup and form a container pool, which can be used by the application. Alternatively, the taskless Containers can be created when the users' activity is expected to increase and can be destroyed once the users' activity decreases. The activity fluctuations can be predicted using time-based or event-based static rules or using dynamic rules (e.g., a Container is discarded if it is not used for a certain time period).

The security of this model can be provided by an arbiter, such as a Runtime Environment (e.g., a Java Virtual Machine (VM) or a similar interpreter VM) running the user code that is verified (in some fashion) to not contain the function calls to switch Containers. First, it has to restrict access to the file descriptors of a process; second, it has to forbid system calls, such as "unshare" or "setns" used to control namespaces. According to the exemplary embodiment, the Runtime Environment (i.e., such as, for example, Java VM, JRE or some other similar VM or environment that is an interpreter of the code, and which can verify that there are no inappropriate calls in the code to switch Containers) serves as an interpreter or an arbiter, which executes code and can concurrently perform other actions (e.g., cleanups). In the proposed approach, the Java VM (or some other similar interpreter, or a component that prevents Container switching function calls) is responsible for creating and switching between the taskless Containers.

LINUX™ kernel protects namespaces management, providing access to privileged users only for namespace modification. The present approach does not require launching with super-user rights, since it is possible to use a user's namespace, which in turn permits the use of other namespaces. Thus, an additional level of isolation from the entire system is implemented. The user can create and manage associated namespaces within this new user namespace. Thus, the approach, advantageously, does not require super user rights to execute, since it can use the user namespace, which allows for use of other namespaces.

FIG. 1 illustrates ordinary Containers and taskless Containers implemented within the same host system. Working Containers 110 and 120 employed by users and taskless Containers 130 and 140 prepared for users in advance and ready to start execution upon a request are running on OS kernel 150. Working Containers 110 and 120 have respective processes 111 and 121 running in them and have namespaces 112 and 122, respectively. In the taskless Containers 130 and 140, all needed namespaces 132 and 142 have already been created, but all the processes used for creating these namespaces have been killed. So, such containers consume 5 times less resources than conventional containers.

It takes a relatively long time to set up namespaces. This operation is already performed in the taskless containers. The only thing needed to process a user request in the taskless container is switching a process into it. So processing user request using taskless container will be much faster than creating and using conventional container for processing it.

Figure 2:
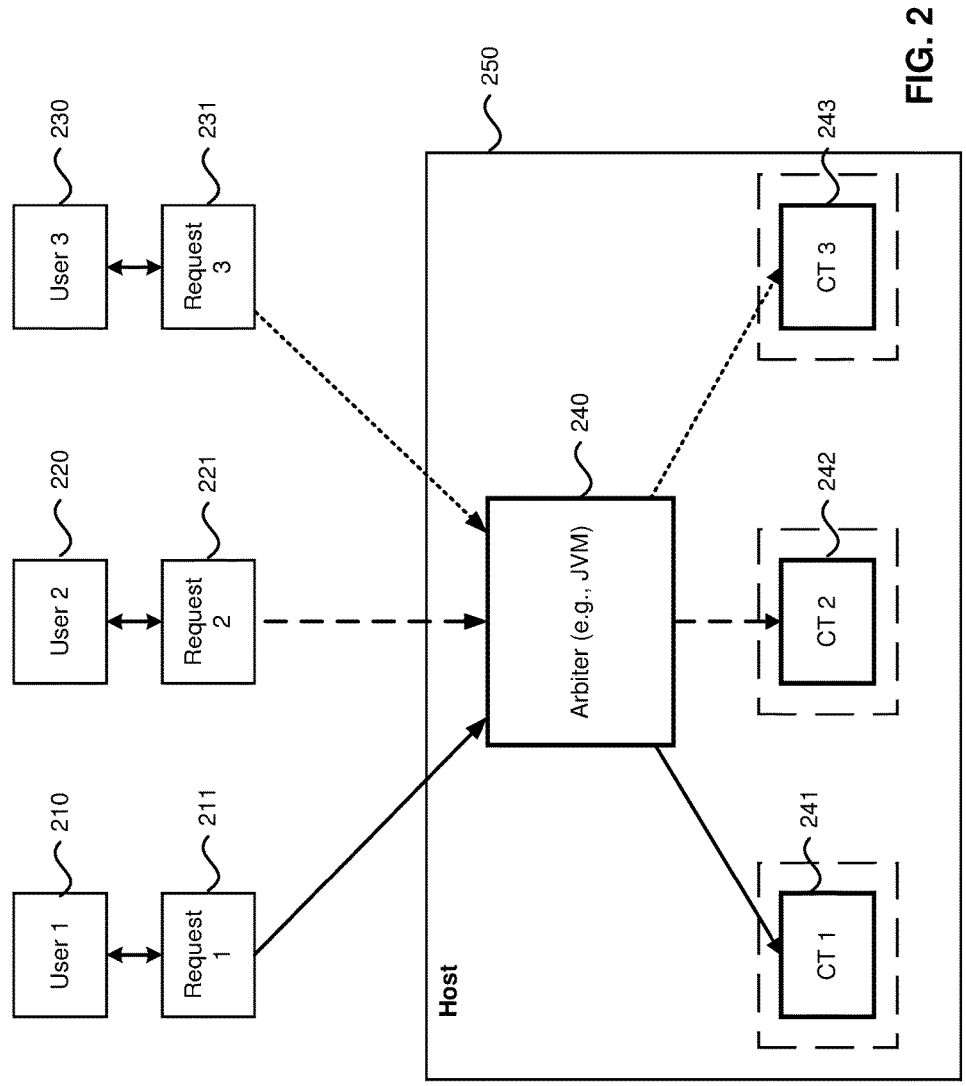
FIG. 2 illustrates system architecture in accordance with the exemplary embodiment.

FIG. 2 illustrates system architecture in accordance with the exemplary embodiment. Containers 241, 242 and 243 are implemented on a host 250. The Containers 241, 242 and 243 are taskless, which means that they have all needed namespaces but does not have processes. A Java Virtual Machine 240 serves as an arbiter, which executes a non-architecture-dependent code. The arbiter 240 receives requests 211, 221 and 231 from respective users 210, 220 and 230. In other words, the arbiter 240 analyses the requests, chooses a container and switches the process to this Container. Note that the arbiter 240 analyses the code running in the Containers 241, 242 and 243 and allows or disallows the process of the application, within which the arbiter is working, to switch between the Containers.

The arbiter 240 also can discard the Containers that do not get user requests for a long time and create new Containers when a number of user requests increases. The arbiter 240 also executes a code to kill the processes used for namespace creation in the Containers 241, 242 and 243.

A user sends a request, which is received by the arbiter. The process that responds to the request is placed into a Container by the arbiter, where the Container matches the particular user. Thus, users are isolated from each other with a relatively modest resource expenditure.

Figure 3:
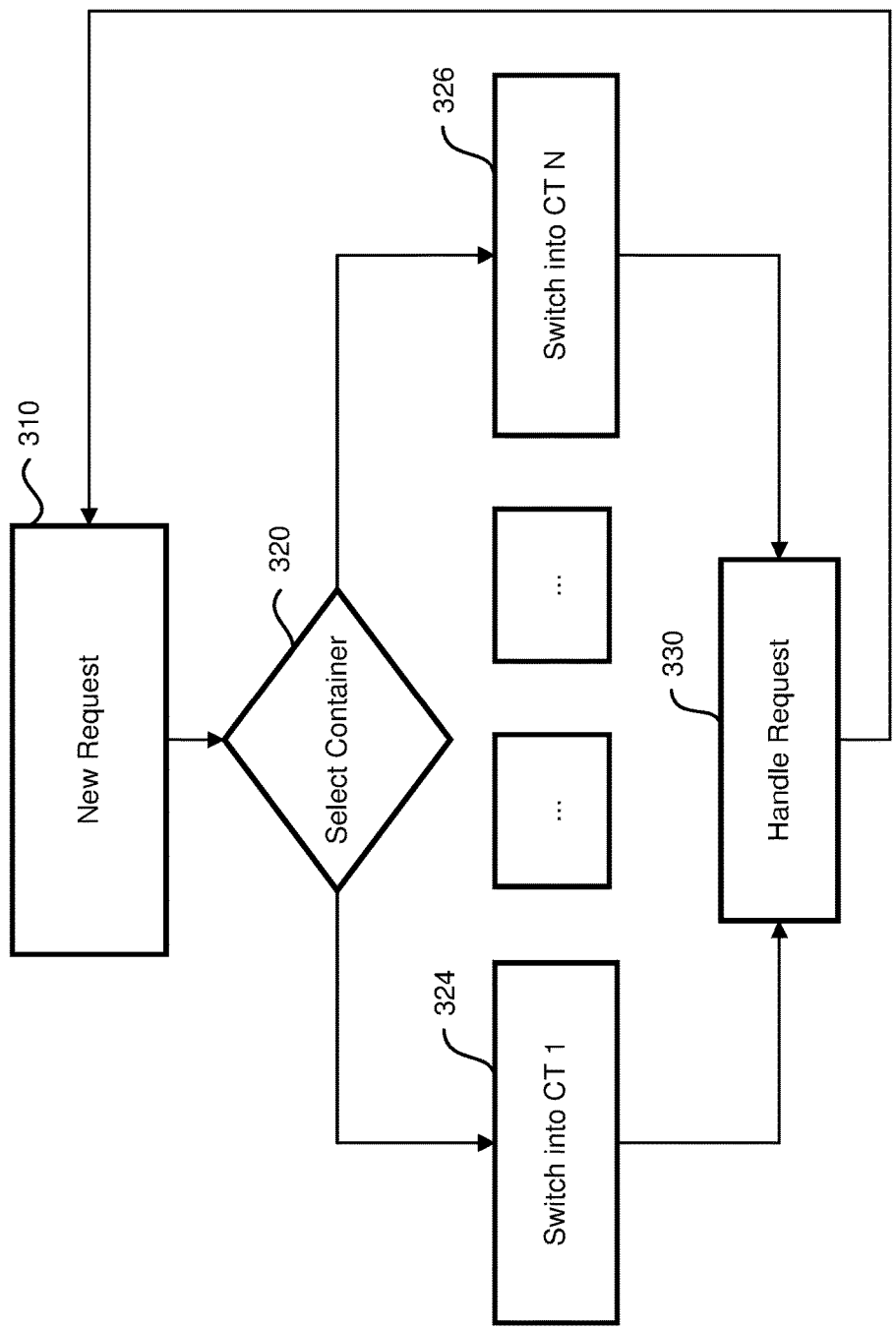
FIG. 3 illustrates a flowchart of a method for Container switching when the Containers are created at startup, in accordance with the exemplary embodiment.

FIG. 3 illustrates a flowchart of a method for Container switching when the Containers are created at startup, in accordance with the exemplary embodiment. This flowchart illustrates the process executed by the system depicted in FIG. 2. In step 310, a new user request is received. The requests, in this context, are requests from external users to some multi-tenant application (applications that process requests from multiple users) that works on the host and uses Containers (e.g., requests for a webpage to an Apache server, request to a multi-tenant database, etc.). In step 320, the arbiter analyzes the request, and finds out which user has sent it, and to which workspace the request is addressed. According to this the arbiter selects a Container for execution of the request (e.g., the taskless container which is associated with this user or with this type of request). Then the arbiter switches to either Container 1 in step 324 or Container N in step 326.

Where the Containers from 1 to N are taskless containers, created at startup, where all the needed namespaces are already configured. Switching to a Container means that process in which the code of arbiter runs, enters the namespaces of this Container using special system call and the descriptors that were opened for this namespaces when the container was created. In step 330, the process handles the request in the selected Container. When the request is handled the process leaves the Container and receives new request (returns to step 310). So when such taskless Containers do not process user requests they do not have any processes in them, and they need less resources than conventional Containers.

Figure 4:
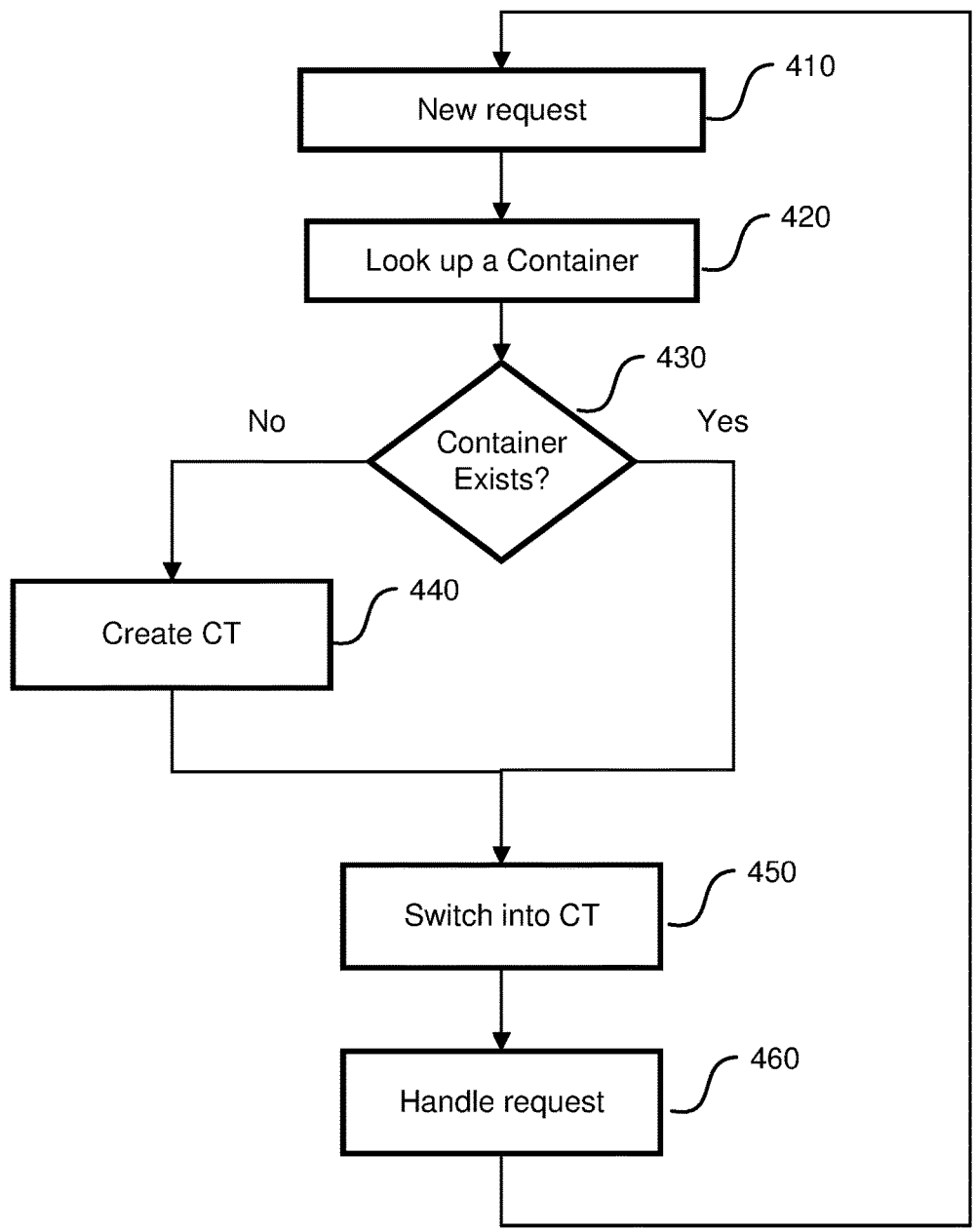
FIG. 4 illustrates a flowchart of a method for Container switching when the Containers are created on-the-fly, in accordance with the exemplary embodiment.

FIG. 4 illustrates a flowchart of a method for Container switching when the Containers are created on-the-fly, in accordance with the exemplary embodiment. A new request is received in step 410. The arbiter analyzes the request (same as shown in FIG. 3) and looks for a Container configured to execute the request in step 420. If the required Container exists in step 430, the arbiter switches the request execution to the Container in step 450, and the request is processed in step 460. If, in step 430, the needed Container does not exist, the Container is created in step 440. Then, the arbiter switches the request execution to the Container in step 450, and the request is processed in step 460. When the request is handled the process leaves the Container.

Figure 5:
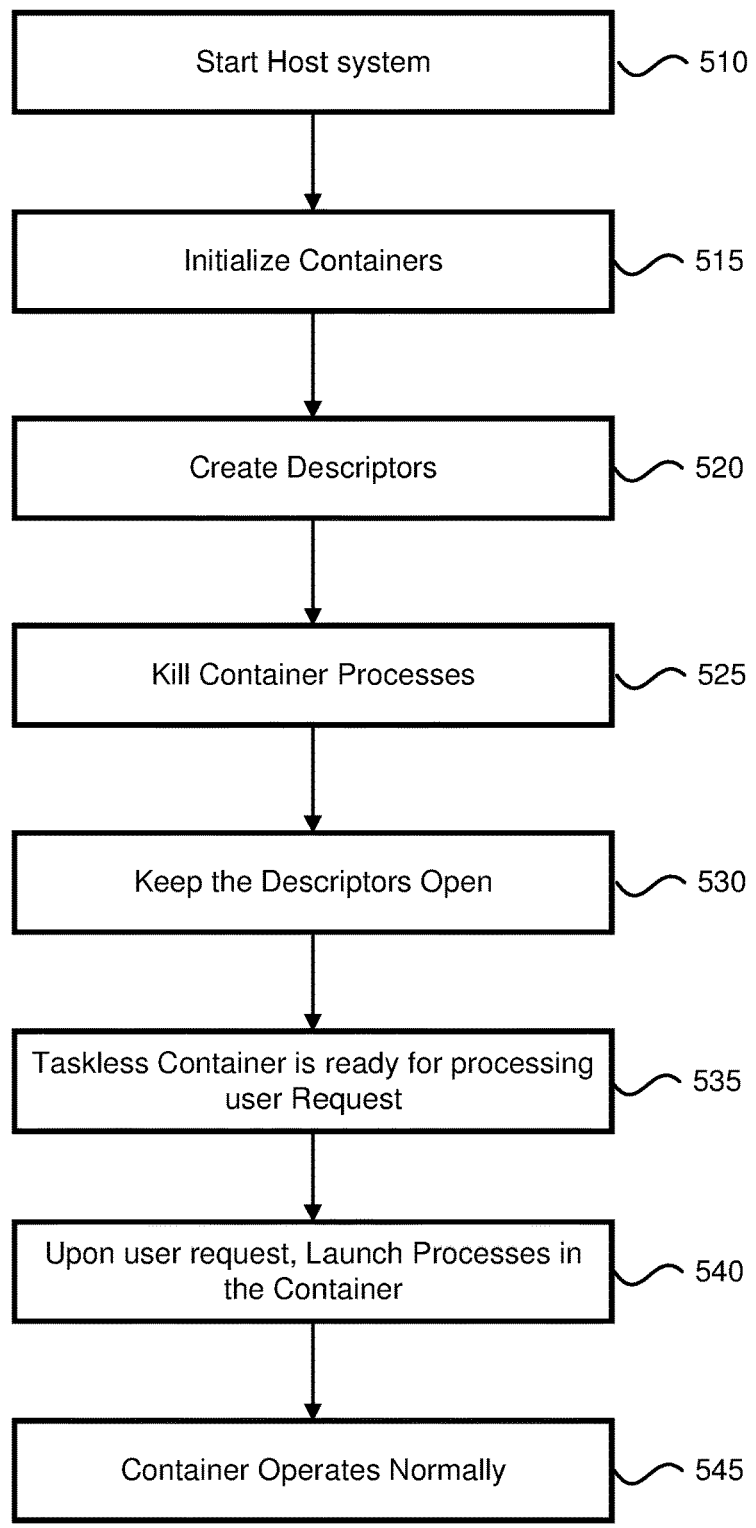
FIG. 5 illustrates a flowchart of a method for deploying a taskless Container, in accordance with the exemplary embodiment.

FIG. 5 illustrates a flowchart of a method for deploying taskless Containers, in accordance with the exemplary embodiment. A host system is started in step 510. In step 515, the Containers are initialized (including setting needed namespaces). Descriptors for namespaces (i.e., namespace handles) are created in step 520 and the container creating processes are killed in step 525. The descriptors are kept open, so it is possible reference the container (which is taskless now) by them starting from step 530. The descriptors (in LINUX) or file handles (in WINDOWS) serve as indicators for accessing and performing operations with a file object by the kernel.

According to the exemplary embodiment, the namespace descriptors (also called namespace handles) (i.e., numerical or alphanumerical values) are used for switching between the namespaces. Note that while the descriptors are open, the object (namespaces) cannot be deleted. The arbiter can close and open descriptors, so it "knows" which descriptors are open and which descriptors are point to which Containers. In step 535, the taskless Container is ready for processing a user request. Upon receiving a user request, the process is switched to the Container in step 540, which means that the process that will handle it enters the container namespaces, i.e., enters the container. Then, the Container now having a process in it operates normally (i.e., as a standard Container, not a taskless Container) in step 545 and handles the user request.

Figure 6:
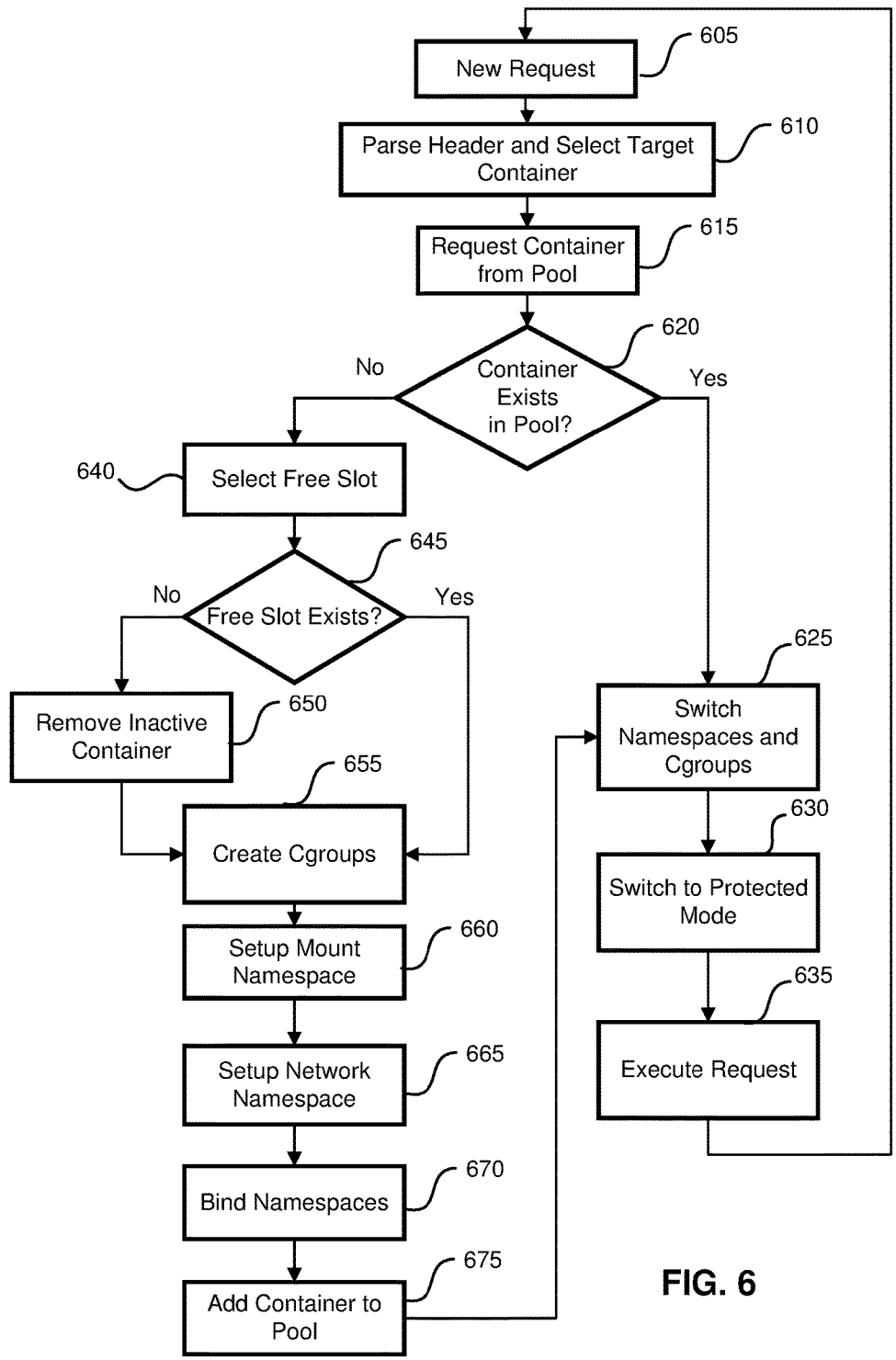
FIG. 6 illustrates a flowchart for managing pools of Containers, in accordance with the exemplary embodiment.

FIG. 6 illustrates a flowchart for processing a request using pools of Containers, in accordance with the exemplary embodiment. The multi-tenant application functions on the host, using different taskless containers for handling requests from different users. In step 605 a new user request is received. The application determines which user (or workspace) is the addressee of the request (e.g., parses the request header) and selects a target Container suitable for execution of the request in step 610. There is a pool of the prepared in advance or already used taskless containers. The arbiter requests the Container from the pool in step 615. If the requested Container exists in the pool in step 620, the arbiter switches to this Container. To do it the arbiter switches namespaces and control groups (Cgroups) in step 625, using the file descriptors, which were opened upon container creation. The process in which the arbiter runs, invokes a special system call—setns( ) for each namespace to enter the namespaces. So the entire process is transferred to the container, rather than merely transferring control to the container, in other words, the arbiter itself is now in the container. Then, the process switches into a protected mode (i.e., untrusted execution context, where the process cannot switch the Container) in step 630.

Once the arbiter is in the container, it executes code to process the request. But before execution, it makes sure that the code does not have any forbidden calls (the system calls for switching containers, such as system call setns( )). Such calls in request handling code can destroy the isolation between users, and cause security problems. This is why the arbiter is need. Arbiter can be Java Virtual Machine or any other execution environment, which is able to check whether the request handling code has forbidden system calls. The request is executed in step 635 and the process leaves the container and moves to the next request (step 605).

In other words, there is only the process, which first receives the request, then processes it as an arbiter (selects the container), enters the Container, blocks system calls for switching Containers and handles the request, exits the Container, and is then ready to receive another request.

If, in step 620, the requested Container does not exist in the pool, the process (as an arbiter) selects a free slot for creation of a Container in step 640. If the free slot does not exist in step 645, the process removes inactive Container in step 650. Otherwise, the process starts creating the new Container. It creates Cgroups in step 655. Arbiter sets up a mount namespace in step 660, and sets up the network namespace in step 665. The namespaces are bound in step 670. For example, in LINUX, a file from /proc/PID/ns/ is opened for each namespace. These file descriptors (namespace handles) are then used to get into the associated namespaces. The taskless Container is added to the pool in step 675. Then, the process moves to step 625.

In some exemplary embodiments there is also a root container, which initiates other containers, and which has access to all the resources. Initially, the arbiter process is in the root container.

In some exemplary embodiments, the instantiating of the taskless Containers includes creating the needed namespaces (like mount, net, IPC, UTS) for the taskless Container; and creating namespace handles for the namespaces. The Containers the process includes creation any of a mount, a net, an ipc (inter-process communication), and a UTS (UNIX Timesharing System) namespaces. But the Containers available to a process will have a common user namespace. All Containers that belong to a process work inside one pid namespace. Optionally, all the Containers of the application, including root Container, will work inside one user namespace. The Containers processing requests of different users will be isolated by other namespaces.

Figure 7:
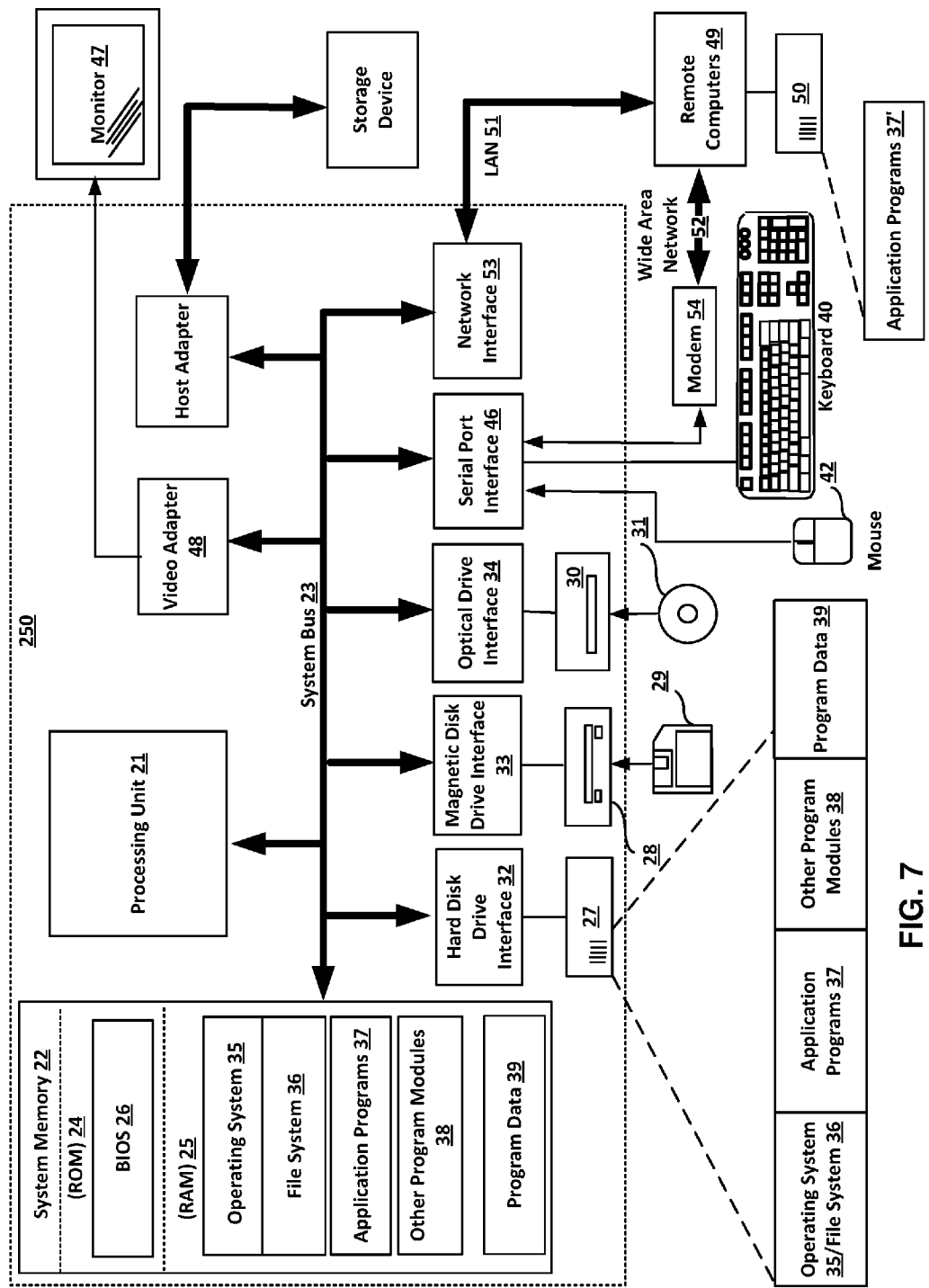
FIG. 7 illustrates a computer system or a host server, which can be used in the exemplary embodiment.

With reference to FIG. 7, an exemplary system for implementing the invention includes a general purpose computing device in the form of a computer or server 250 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 250, such as during start-up, is stored in ROM 24.

The server 250 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 250. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 250 includes a file system 36 associated with or included within the operating system 35, such as the Windows NT™ File System (NTFS), one or more application programs 37, other program modules 38 and program data 39. A user may enter commands and information into the server 250 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 250 may operate in a networked environment using logical connections to one or more remote computers 49. The remote computer (or computers) 49 may be another personal computer, a server, a router, a network PC, a peer device or other common network node, and it typically includes some or all of the elements described above relative to the server 250, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 250 is connected to the local network 51 through a network interface or adapter 53. When used in a WAN networking environment, the server 250 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 250, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for managing Containers (CTs) residing on a common host, the system comprising:
    the common host comprising a processor and a memory;
    at least one working CT running under an OS kernel of the common host and executing user processes;
    a plurality of taskless CTs configured to have namespaces and not executing user processes, wherein the working CT and the taskless CTs are isolated environments allocating common host resources using Cgroups;
    a multi-tenant application running on the common host; and
    an interpreter Virtual Machine (VM) running on the common host and configured to receive and process user requests, and to ensure that user code being executed does not attempt to switch CTs, wherein the interpreter VM is configured to:
        select a taskless CT from the plurality of taskless CTs based on the user requests; and
        switch to the selected taskless CT from a working CT for execution of the user requests by the multi-tenant application, and wherein the interpreter VM is the only component in the system that is permitted to switch CTs, and wherein the receiving and the processing of the user requests is performed by the same user process despite the switching of the CTs.

2. The system of claim 1, wherein the interpreter VM is further configured to identify for each user request a corresponding user whose context is required for processing of the user request.

3. The system of claim 1, wherein the interpreter VM runs on the same common host as the CTs and serves as an arbiter between the CTs.

4. The system of claim 1, wherein each taskless CT corresponds to one user.

5. A method for managing Containers (CTs) residing on a common host, the method comprising:
    instantiating a working CT executing a user process on the common host;
    launching an arbiter Virtual Machine (VM) on the common host, wherein the arbiter VM is a code interpreter that ensures that code being executed does not attempt to switch CTs;
    initializing a plurality of taskless CTs on the common host;
    creating namespace handles for the taskless CTs by the arbiter VM;
    keeping the namespace handles open;
    receiving a user request;
    selecting the taskless CT from the plurality of taskless CTs based on the user request; and
    switching, by the arbiter VM, the user process for executing the user request from the working CT to the selected taskless CT by using pre-opened namespace handles for the selected taskless CT, wherein the arbiter VM is the only component in the system that is permitted to switch CTs, wherein the receiving and the processing of the user request is performed by the same user process despite the switching of the CTs, and wherein the working CT and the taskless CTs are isolated environments virtualizing an operating system and a file system of the common host, and allocating common host resources.

6. The method of claim 5, further comprising parsing the user request to identify a user whose context is required to process the request.

7. The method of claim 5, further comprising killing CTs' creation processes in the selected taskless CT by the arbiter VM.

8. The method of claim 5, further comprising creating an additional taskless CT on-the-fly, when there is no CT corresponding to a user of the user request.

9. The method of claim 5, further comprising creating a pool of taskless CTs, including the taskless CTs for all users.

10. The method of claim 9, further comprising removing an inactive CT from the pool, and wherein the CT is marked as inactive if it does not receive user requests for a predefined time period.

11. The method of claim 5, wherein the step of creating the taskless CTs further comprises:
    creating needed namespaces for the taskless CT; and binding the created namespaces by creating namespace handles for the created namespaces.

12. The method of claim 11, further comprising:
switching the namespaces;
switching to an untrusted context; and
executing the user request.

13. A system for managing Containers, comprising:
a hardware node running an operating system;
a multi-tenant application running under the operating system;
a plurality of Containers instantiated under the operating system, wherein the Containers are isolated environments virtualizing the operating system and a file system of the common host, and allocating common host resources using Cgroups, wherein a user process of the multi-tenant application uses only one Container of the plurality of Containers at any one time, and wherein the remaining Containers of the plurality of Containers that are available to the user process are taskless Containers that are not executing any user processes; and
an arbiter component that controls permissions for the user process to switch from one Container to another Container, wherein the arbiter component defines trusted and untrusted execution contexts, such that code of the user process executing in the untrusted context is not permitted to switch Containers, and the code of the user process executing in the trusted context is permitted to switch Containers, and wherein the arbiter component detects any attempts to switch Containers, and prevents these attempts when executing the code in an untrusted context, wherein, upon a request from a user to the multi-tenant application, the arbiter component switches the user process that will process the user request to one of the taskless Containers and executes the request in the untrusted context, and wherein the receiving and the processing of the user request is performed by the same user process despite the switching of the Containers.

14. The system of claim 13, wherein the arbiter component analyzes the code of the user process before executing it, to prevent the attempts to switch the Containers.

15. The system of claim 13, wherein the arbiter component uses any of ptrace, audit, and selinux to prevent the attempts to switch Containers.

16. The system of claim 13, wherein the arbiter component is a runtime environment.

17. The system of claim 13, wherein the arbiter component is an interpreter virtual machine.

18. A method for managing Containers, comprising:
on a hardware node running an operating system, starting a multi-tenant application under the operating system;
instantiating a plurality of Containers under the operating system, wherein the containers are isolated environments virtualizing the operating system and a file system of the common host, and allocating common host resources, wherein a user process of the multi-tenant application uses only one Container at any one time, and wherein the remaining Containers of the plurality of Containers that are available to the user process are taskless Containers that have no user processes running in them;
starting an arbiter component to control permissions for the user process to switch from one Container to another Container, in the arbiter component, defining trusted and untrusted execution contexts, such that code of the user process executing in the untrusted context is not permitted to switch Containers, and the code of the user process executing in the trusted context is permitted to switch Containers;
in the arbiter component, detecting any attempts to switch Containers, and preventing these attempts when executing the code in an untrusted context; and
upon a request from a user to the multi-tenant application, using the arbiter component to switch the user process that will process the user request to one of the taskless Containers and executing the request in the untrusted context, wherein the processing of the user request is performed by the same user process despite the switching of the Containers.

19. The method of claim 18, wherein the instantiating of the plurality of taskless Containers comprises, for each taskless Container:
creating namespaces for the taskless Container; and
creating namespace handles for the namespaces.

20. The method of claim 19, wherein the namespaces include any of a mount, a net, an IPC (inter-process communication), and a UTS (UNIX Timesharing System) namespaces.

21. The method of claim 18, wherein all Containers that belong to a particular process work inside one pid namespace.

22. The method of claim 18, wherein all the taskless Containers available to the user process have a common user namespace.

23. The method of claim 18, wherein the user process uses namespace handles to switch between Containers.

24. The method of claim 18, wherein user processes used for setup of the taskless Container are killed, while their namespaces continue to exist.

25. The method of claim 18, wherein the arbiter component verifies that user code does not contain function calls to switch Containers.

26. The method of claim 18, wherein the arbiter component allows or disallows the user process of the multi-tenant application, within which the arbiter is working, to switch between the working Container and the one of the taskless Containers.

27. The method of claim 18, wherein all the taskless Containers are created to form a container pool, which is then used by the multi-tenant application.

28. The method of claim 18, wherein the arbiter component discards any taskless Containers that do not get user requests for a specified period of time.

* * * * *